United States Patent [19]
McCombs

[11] 4,047,656
[45] Sept. 13, 1977

[54] ORBITAL MOTION WELDING HEAD
[75] Inventor: Paul W. McCombs, Connersville, Ind.
[73] Assignee: Mac Machine & Metal Works Inc., Connersville, Ind.
[21] Appl. No.: 663,239
[22] Filed: Mar. 3, 1976
[51] Int. Cl.² .......................... B23K 9/12; B23K 9/28
[52] U.S. Cl. .................................. 228/27; 219/125 R
[58] Field of Search ...................... 228/27, 28, 29, 32; 219/125 R, 124, 73 R

[56] References Cited
U.S. PATENT DOCUMENTS 3,260,834  7/1966  Arnoldy .............................. 219/73 R
3,396,263  8/1968  Even et al. ........................ 219/125 R Primary Examiner—Al Lawrence Smith
Assistant Examiner—K. J. Ramsey
Attorney, Agent, or Firm—Woodard, Weikart Emhardt & Naughton

[57] ABSTRACT

Disclosed is a welding head, for metallic arc inert gas (MIG) welding, which is to be moved by an external guidance system over a work surface. The head has an eccentric spindle, carrying the welding wire, which is rotated by its own electric motor to move the spindle in a circular or orbital path as the head is moved by the external guidance system over the work surface.

2 Claims, 2 Drawing Figures

ORBITAL MOTION WELDING HEAD

BACKGROUND OF THE INVENTION

In MIG welding the arc is maintained between a metallic electrode (expendable, filler welding wire) and the work. The melting of the electrode supplies filler metal to the weld and is continuously fed into the weld metal pool. A shielding, inert gas fed through the welding head provides the necessary protective atmosphere for the weld. This known method of fusion welding is rapid and relatively inexpensive. However, difficulty has been encountered in machine guided welding operations where relatively light gauge metal plate seams are to be welded, the seams being irregular and intricately curved and the pieces to be welded not held to close dimensional tolerances. Under these conditions, the gap to be closed by the weld, applied by the rapidly traversing head, may be, at intervals, too wide, and defective welds result. One application where this difficulty has been encountered is in the welding of the curved, light gauge metal sheets forming the end plates or bridge members of burial casket cap components. Attempts have been made to overcome the problem by providing a reciprocating or back-and-forth motion to the welding head as it traverses the work. Such an arrangement is shown in Bartley U.S. Pat. No. 3,841,547. The back-and-forth motion of the welding gun, however, encounters difficulty where the seam to be welded is curved somewhat sharply because, in this situation, some means must be provided to maintain the back-and-forth motion path of the welding head transverse to the curved, non-rectilinear seam to be welded. The welding head must be properly oriented with relation to the curving seam to be welded as the head is rapidly machine guided over the work by the external guiding system. This requires providing relatively complicated and expensive mounting or coupling between the welding head and the external guidance system.

The apparatus of the present invention provides a relatively simple, uncomplicated means for moving the welding gun in a circular or orbital path as the welding head is machine guided over the work, the orbital path providing a relatively flat weld bead which fills the spaces between the parts being welded even though the seam is intricately or sharply curved.

DESCRIPTION OF THE PREFERRED EMBODIMENT

Figure 1:
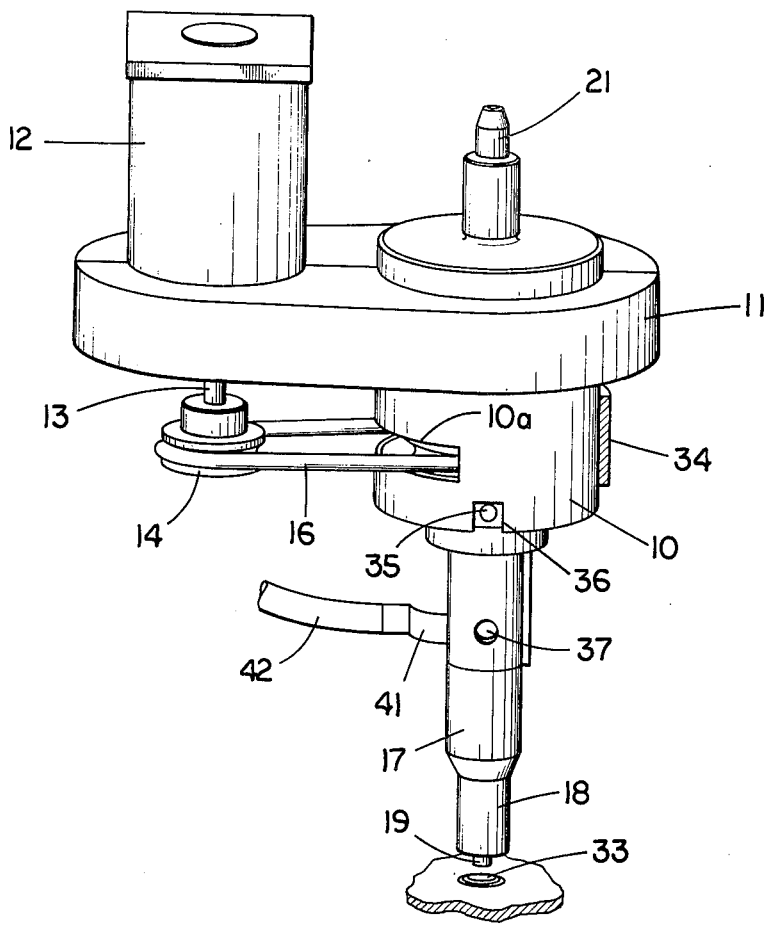
FIG. 1 is a perspective view of the welding head of the present invention.

Referring initially to FIG. 1, the welding head assembly includes a tubular body 10 which depends from the central support member 11, preferably formed of electrical insulating material, which spaces a variable speed motor 12 from the housing 10. The motor shaft 13 extends below the member 11 and carries a pulley 14 which, by means of the belt 16 provides the necessary rotary motion for an interior component of the welding head to be subsequently described. Depending from the lower end of the housing is a tubular welding gun body 17 and attached to the lower end of the welding gun body is an inert gas shielding nozzle 18. The tip portion 19 extends from the member 18. A circular weld illustrating the circular or orbital path of the weld laid down by the assembly is illustrated at 33. A band, as shown fragmentarily at 34, and secured to housing 10 may be utilized to provide a means for attaching the assembly to the external apparatus (not shown) which carries the assembly shown in FIG. 1 over a predetermined path which may include irregular and sharply curved contours.

Figure 2:
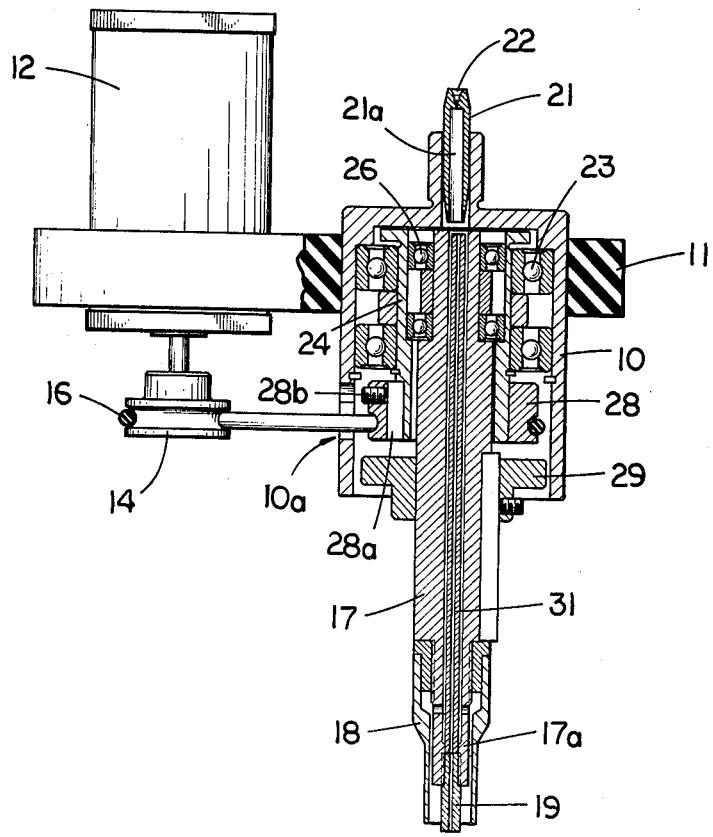
FIG. 2 is a side view of the apparatus shown in FIG. 1 with the welding gun component in cross section.

Referring to FIG. 2, the interior components of the welding head will now be described. Supported at the upper end of the housing 10 and extending partially therefrom is a welding wire inlet guide 21 whose central bore 22, it will be understood, receives the welding wire (not shown) from an exterior reel, the wire being fed at proper speed by means not shown into the bore 22. The member 21 serves to guide the welding wire into the interior of the body 10. The central bore of the tubular body 10 supports, by means of the bearing 23 a cylindrical spindle 24, the spindle being capable of rotational movement with relation to the housing 10. The central bore of the spindle 24 is offset or eccentric with relation to the central bore of the tubular body 10. The spindle supports the exterior face of the roller bearing assembly 26 and, by means of the bearing, supports the tubular welding gun body 17 previously mentioned with reference to FIG. 1.

The welding gun body 17 extends centrally through the spindle bore and, by means of bearing 26 is capable of free axial rotation with relation to the spindle.

A pulley 28 is rigidly secured to the exterior of the spindle 24 by means of the key 28a and set screw 28b, the pulley 28 accommodating the belt 16, previously mentioned. The belt 16 extends through an aperture 10a in the housing and functions to transfer the rotary motion of the pulley 14 to the eccentric spindle 24. A collar 29 is rigidly secured to the body 17 and an abutment 35 (FIG. 1) extending from the collar protrudes into a notch 36 (FIG. 1) in the body 10, the abutment 35 and the notch 36 serving to prevent rotation of the body 17 with relation to the member 10.

Extending throughout the central bore of the welding gun body 17 is a liner or sleeve 31, its central bore being adapted to receive and guide the welding wire. The sleeve 31 extends into a reduced diameter portion 17a of the gun body 17 and registers with the tip member 19 previously mentioned. The nozzle member 18 encloses these components for substantially their entire length and as may best be seen in FIG. 1, somewhat above the upper end of the nozzle 18 a threaded aperture 37 is provided which communicates with the space between the sleeve 31 and the surface of the central bore of the body member 7 and is adapted to have attached to it a tube (not shown) supplying the inert shielding gas which is required for the MIG process. It will be noted, as shown in FIG. 2, that the lower end of the tubular inlet guide 21 has an enlarged bore 21a communicating with the bore 22 and that the lower end of the guide 21 is spaced somewhat above the upper end of the sleeve 31. As may be seen in FIG. 1 an electrically conducting lug 41, to which is attached the conventional welding current power cable 42, the arrangement being such that, in conventional fashion, there is electrical continuity between the cable 42 and the welding wire carried within the sleeve 31.

In operation, as the external apparatus guides the head assembly in its path over the seam to be welded, with the motor 12 in operation, the spindle 24 will be rotated and, because of its eccentric bore the welding gun body 17, and the welding electrode carried by it, will be moved in a circular path defined by the eccentricity of the spindle bore. The speed of the orbital movement of the welding gun may be varied by varying the speed of motor 12 and the diameter of the orbital movement may be varied by replacing spindle 24 with a correspondingly sized spindle but having a different magnitude of eccentricity. In one application, in welding relatively light gauge material, an orbital diameter of 0.040 inches has been found to be satisfactory with a speed of approximately 500 orbits per minute as the external guiding system moves the welding head at a velocity of approximately 30 inches per minute along the workpiece. These parameters for the welding head are suitable for use with welding filler wire having a diameter of 0.035 inches. The resulting weld is relatively flat and laid down in overlapping circles as illustrated at 21 in FIG. 1. Spaces between the adjoining components of the work surface, which may be caused by dimensional tolerance variation in the pieces, are filled and the maximum diameter or width of the gun movement is always presented to the seam to be welded. As previously mentioned, the lower end of the guide member 21 is spaced from the upper end of the sleeve 31 and the member 21 is provided with an enlarged bore portion 21a. The enlarged bore and the space between the member 21 and the sleeve 31 permits accomodation of the oribital movement of the upper end of the sleeve 31 as the member 21 remains stationary without placing excessive shearing stress on the weld filler wire passing through the guide member and sleeve.

Because the motion of the welding gun is circular, rather than rectilinear, it can be used with any type of guiding system no matter how irregular or sharply curved the welding path might be.

While the invention has been disclosed and described in some detail in the drawings and foregoing description, they are to be considered as illustrative and not restrictive in character, as other modifications within the scope of the invention may readily suggest themselves to persons skilled in the art.

I claim:

1. A welding head adapted to be moved so as to traverse a work surface to be welded, said head comprising a central support member and a tubular body carried thereby, a cylindrical spindle supported for free axial rotation within said tubular body about an axis parallel to the central longitudinal axis of said tubular body, the central bore of said spindle being offset with relation to the central bore of said tubular body, a tubular welding gun body extending centrally through said spindle bore and supported by said spindle for free axial rotation with relation thereto about an axis parallel to said central longitudinal axis of the tubular body, power means for axially rotating said spindle, and means for restraining said welding gun body against axial rotation with said spindle, whereby the tip of said welding gun body traces a generally circular path defined by the eccentricity of said spindle bore as said spindle is rotated by said power means, said circular path movement being independent of the work surface traversing movement of the welding head.

2. A welding head as claimed in claim 1 in which said means for restraining said welding gun body against axial rotation comprises cooperating abutments on said tubular body and on said welding gun body.

* * * * *